(12) United States Patent
Camellini (10) Patent No.: US 11,548,462 B2
(45) Date of Patent: Jan. 10, 2023

(54) PARTITION WALL FOR COMMERCIAL VEHICLES

(71) Applicant: GEMA S.R.L., Campi Bisenzio (IT)

(72) Inventor: Giancarlo Camellini, Campi Bisenzio (IT)

(73) Assignee: GEMA S.R.L., Campi Bisenzio (IT)

( * ) Notice: Subject to any disclaimer, the term of this patent is extended or adjusted under 35 U.S.C. 154(b) by 967 days.

(21) Appl. No.: 16/340,505

(22) PCT Filed: Sep. 19, 2017

(86) PCT No.: PCT/IB2017/055661
§ 371 (c)(1),
(2) Date: Apr. 9, 2019

(87) PCT Pub. No.: WO2018/051314
PCT Pub. Date: Mar. 22, 2018

(65) Prior Publication Data
US 2021/0261078 A1    Aug. 26, 2021

(30) Foreign Application Priority Data
Sep. 19, 2016   (IT) .................. 102016000094007

(51) Int. Cl.
*B60R 21/00*    (2006.01)
*B60R 21/02*    (2006.01)
*E05D 15/06*    (2006.01)

(52) U.S. Cl.
CPC ........ *B60R 21/026* (2013.01); *E05D 15/0665* (2013.01); *E05Y 2900/531* (2013.01)

(58) Field of Classification Search
CPC ........ B60R 21/06; E05D 15/0665; B60J 5/12; E05F 15/56; B62D 33/06
USPC .............. 296/24.4, 155, 190.11, 77.1, 146.6
See application file for complete search history.

(56) References Cited

U.S. PATENT DOCUMENTS

| 183,857 A | 10/1876 | Laauwe |
| 3,416,183 A * | 12/1968 | Martin ................ E05D 15/0673 49/420 |
| 3,698,036 A | 10/1972 | Goodman |
| 4,112,622 A * | 9/1978 | Stewart ................. E05D 15/066 49/421 |

(Continued)

FOREIGN PATENT DOCUMENTS

| EP | 1 772 582 A1 | 4/2007 |
| FR | 2 888 533 A1 | 1/2007 |

(Continued)

*Primary Examiner* — D Glenn Dayoan
*Assistant Examiner* — Sunsurraye Westbrook
(74) *Attorney, Agent, or Firm* — McGlew and Tuttle, P.C.

(57) ABSTRACT

The partition wall for commercial vehicles comprises at least one fixed plate (20) and a sliding door (10) able to slide with respect to said fixed wall (20), predisposed to separate the cockpit of the vehicle from the loading compartment. The sliding door (10) is provided, along the upper edge and along the bottom edge, with a plurality of sliding wheels (11, 12) predisposed to slide respectively on an upper guide (13) and on a lower guide (14) associated with the structure of the vehicle. The sliding wheels (11, 12) have a grooved profile predisposed to be coupled with a corresponding rail (19) of said guides (13, 14) having conjugated profile.

13 Claims, 5 Drawing Sheets

(56) References Cited

U.S. PATENT DOCUMENTS

| | | | |
|---|---|---|---|
| 6,336,247 B1* | 1/2002 | Schnoor | E05D 15/0652 |
| | | | 160/214 |
| 9,573,448 B2* | 2/2017 | Clark | E05F 15/56 |
| 10,538,947 B2* | 1/2020 | Boring | E05D 15/0626 |
| 2003/0201074 A1 | 10/2003 | Schnoor | |
| 2015/0174992 A1 | 6/2015 | Clark et al. | |
| 2018/0184853 A1* | 7/2018 | Wei | A47K 3/286 |
| 2018/0238672 A1* | 8/2018 | Miyagi | G06F 3/03547 |
| 2018/0283070 A1* | 10/2018 | Hamilton | E05D 15/0669 |

FOREIGN PATENT DOCUMENTS

| | | |
|---|---|---|
| FR | 2 995 624 A1 | 3/2014 |
| JP | 2003 097137 A | 4/2003 |

* cited by examiner

PARTITION WALL FOR COMMERCIAL VEHICLES

TECHNICAL FIELD

The present invention concerns a partition wall for commercial vehicles and the like.

BACKGROUND ART

It has been known the use of commercial vehicles equipped for specific activities. These commercial vehicles allow the user to move to where his intervention is needed. A particular type of commercial vehicle is equipped for the delivery of articles packaged packs, even of small size, envelopes and the like. The growing diffusion of mail-order channels has made it clear that there is a need for increasing the functionality of commercial vehicles responsible for the distribution of articles.

Particularly known in the specified field is the use of commercial vehicles equipped internally with a sliding wall connecting the cockpit of the vehicle with the rear loading compartment. This allows the driver to access the shelves usually provided in a vehicle to contain the articled to be delivered, without having to get out of the vehicle and open the loading hatch. In this way, picking articles is made easier and faster.

According to a known technique, the sliding door is provided with a sliding carriage associated with an upper rail, essentially consisting of a rail constrained to the structure of the vehicle through a special counter-frame, which increases the space required by the sliding door. This solution, however, makes generally unstable the mounting of the sliding door as it generates vibrations and annoying noises during the driving. This disadvantage is particularly evident when the vehicle is used on roads with imperfect bottom. In this case, the stress to which the vehicle is subjected, transmitted to the counter-frame supporting the sliding door, can more easily determine the above-mentioned vibrations.

A further problem complained with respect to sliding doors is the noise. As a matter of facts, backlash possibly existing between the assembled components, for example between the carriage and the guide, can cause annoying noises to the driver. Such backlash is mostly due to wear and tear of the vehicle over time or to faults possibly present in the assembled components.

It is also complained that, in the known solutions, the protection of the cockpit is not adequately ensured, for example in the case of load movements caused by sudden manoeuvres.

PRESENTATION OF THE INVENTION

The task of the present invention is to solve the aforementioned problems by devising a partition for commercial vehicles that enables the user an easy and quick access from the cockpit to the loading compartment.

Within such task, it is a further scope of the present invention to provide a partition wall for commercial vehicles that does not generate vibrations during vehicle running.

Another scope of the invention is to provide a partition wall that is easy to mount inside commercial vehicles.

Another scope of the invention is to provide a partition wall for commercial vehicles that guarantees safety of the cockpit of the vehicle in the event of any possible movement of the load.

A further scope of the invention is to provide a partition wall that is robust and stress-resistant.

Another scope of the invention is to provide a partition wall for commercial vehicles of simple constructive and functional conception, versatile use, having surely reliable functioning and relatively economic cost.

The cited scopes are reached, according to the present invention, by the partition wall for commercial vehicles according to claim 1.

According to the present invention, the partition wall for commercial vehicles, predisposed to separate the cockpit of the vehicle from the loading compartment, comprises a sliding door which is provided, along the upper edge and along the bottom edge, with a plurality of sliding wheels predisposed to slide respectively on an upper guide and on a lower guide associated with the structure of the vehicle.

The door is able to slide relative to at least one fixed plate.

Advantageously, said sliding wheels have a grooved profile that is predisposed to be coupled with a corresponding rail shaped by said guides having a profile conjugated to that of the same sliding wheels.

At least one between said upper guide and said lower guide has elastic features to compensate for backlash present in the coupling of said sliding wheels with said respective guides. Advantageously, at least one of said upper guide and said bottom guide is associated with elastic means for compensating for said backlash.

Preferably, said elastic means comprise spring means. The spring means keep each guide in a compression state, ensuring an optimal coupling between each of said sliding wheel and said rail.

Preferably, said spring means include helical springs, rod springs, or strip springs.

Alternatively, at least one of said upper guide and said bottom guide is made of a material having elastic features to compensate for said backlash. In this case, the guide, due to the stress to which it is subjected, by virtue of its elastic features, deforms and then reacquires the original shape corresponding to the condition of absence of stress, thereby performing the compensation of the backlash. Preferably, at least one of said upper guide and said lower guide is made of harmonic steel.

Alternatively, said elastic means are associated with said sliding wheels for exerting a compression force on the coupling of the sliding wheels with the respective guides.

Advantageously, said grooved profile of the sliding wheels and said conjugated profile of the rail of said guides have substantially triangular shape.

Advantageously, said sliding wheels are made up of anti-noise plastic material.

Preferably, said sliding door is made in modular manner by a plurality of longitudinal members made of aluminium extrusions. The door thus obtained gives excellent mechanical resistance with a low weight.

Preferably, said longitudinal members are fixed side by side to a top joining profile and to a lower joining profile, having U-shaped transverse profile so as to provide respectively a sort of channel within which said sliding wheels are housed.

Preferably, said sliding door is lockable in the closure position through an anti-intrusion device.

Preferably, said upper guide and said lower guide are connected with respective support profiles predisposed to be mounted on said structure of the vehicle, said support profiles being fixed to said at least one fixed plate. The combination of the guides with respective support profiles fixed to the at least one fixed plate allows to ease and accelerate the assembly of the partition wall on the vehicle as it is possible to easily pre-assemble the assembly comprising the sliding door and the at least one fixed plate and, subsequently, mount such assembly on the vehicle with the aid of preferably moulded elements. This solution also allows reducing mounting errors as the number of components to be assembled on the vehicle is reduced and there is no need for complex alignment and coupling of the components.

Preferably, said upper guide and said lower guide are connected with said respective support profiles by coupling means, for example of the type of screw means.

Alternatively, the coupling between each of said guides and the respective support profile can be made by interlocking.

Preferably, each support profile has a base surface on which an opening is obtained.

Preferably, said opening extends along a longitudinal direction of the profile defining a channel suitable to allow the insertion of at least a portion of said respective guide or at least a portion of said sliding wheels.

Preferably, each said rail of said guide is placed at said opening of said respective support profile to allow the coupling between said profile of said rail and said grooved profile of said sliding wheels.

According to an aspect of the invention, each of said guide is spaced from the respective support profile, said rail occupies a position above or below said opening and said sliding wheels is partially inserted through said opening to make the sliding coupling with said rail. In this way, each sliding wheel is enclosed by at least one portion, on both sides, of the support profile preventing the wheel from being removed from its position in the event of stress applied on the sliding door. This feature gives robustness and stability to the sliding door.

According to another aspect of the invention, each said rail is inserted through said opening of the respective support profile so that it protrudes from the plane defined by said base surface of the support profile.

DESCRIPTION OF DRAWINGS

Details of the invention shall be more apparent from the detailed description of a preferred embodiment of the partition wall for commercial vehicles, illustrated for indicative purposes in the attached drawings, wherein.

BEST MODE

With particular reference to such Figures, the partition wall for use inside a commercial vehicle to separate the cockpit from the loading compartment is indicated in its entirety with 1.

The partition wall 1 comprises a sliding door 10 which is mobile with respect to at least one fixed plate 20. In practice, the partition wall 1 comprises a pair of fixed plates 20 between which there is a passage space, closed in use by the sliding door 10.

The sliding door 10 is provided, along the upper edge and along the bottom edge, with a plurality of sliding wheels 11, 12 predisposed to slide respectively on a top guide 13 and on a lower guide 14 associated with the structure of the vehicle.

The sliding wheels 11, 12 are preferably made of anti-noise plastic material.

Preferably, the upper guide 13 and the lower guide 14 are mounted on respective support profiles 130, 140 predisposed to be mounted on the structure of the vehicle. Such support profiles 130, 140 are suitably connected with the fixed plates 20 in order to allow a pre-mounting of the partition wall and ease its assembly on the vehicle.

In particular, the upper guide 13 and the lower guide 14 are connected to respective support profiles 130, 140 through coupling means 100, for example of screw type.

Alternatively, the coupling between each guide 13, 14 and the respective support profile 130, 140 can be made by interlocking.

Each profile 130, 140 has a face which constitutes a base surface 131, 141 suitable for use in coupling with the respective guide 13, 14. On this base surface 131, 141 there is an opening 132, 142.

Each opening 132, 142 extends along a longitudinal direction of the longitudinal profile 130, 140 by defining a channel suitable to allow the insertion of at least a portion of the guide 13, 14 or at least a portion of the sliding wheels 11, 12, as better explained in the following.

Figures 1, 2:
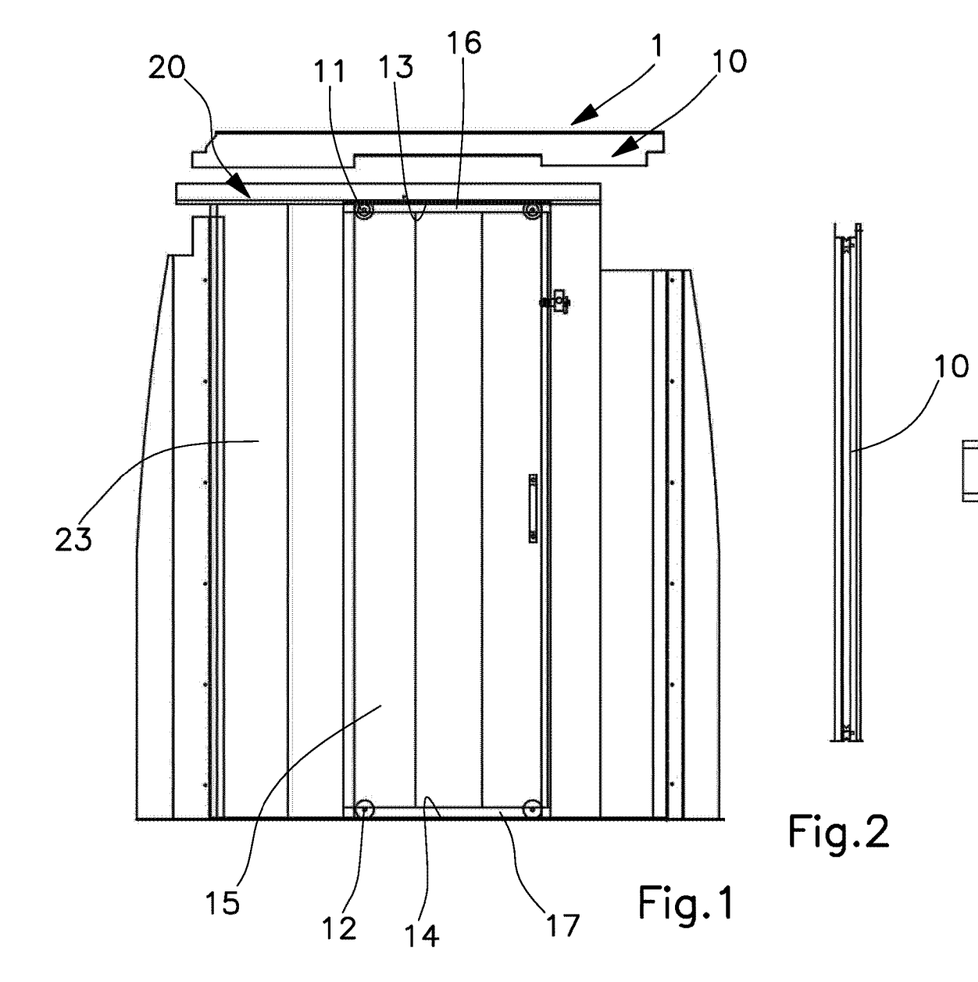
FIG. 1 shows a front view of the partition wall according to the invention.
FIGS. 2 and 3 respectively show a side and a cross-sectional view thereof.
Figure 3:
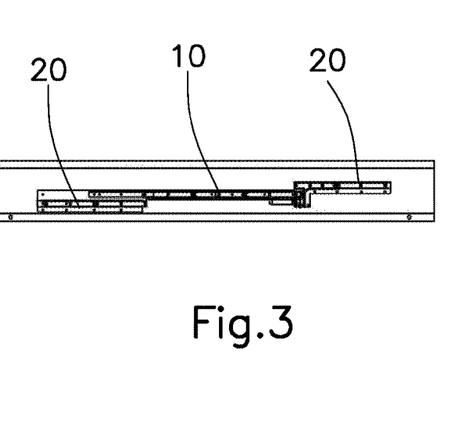
Figure 4:
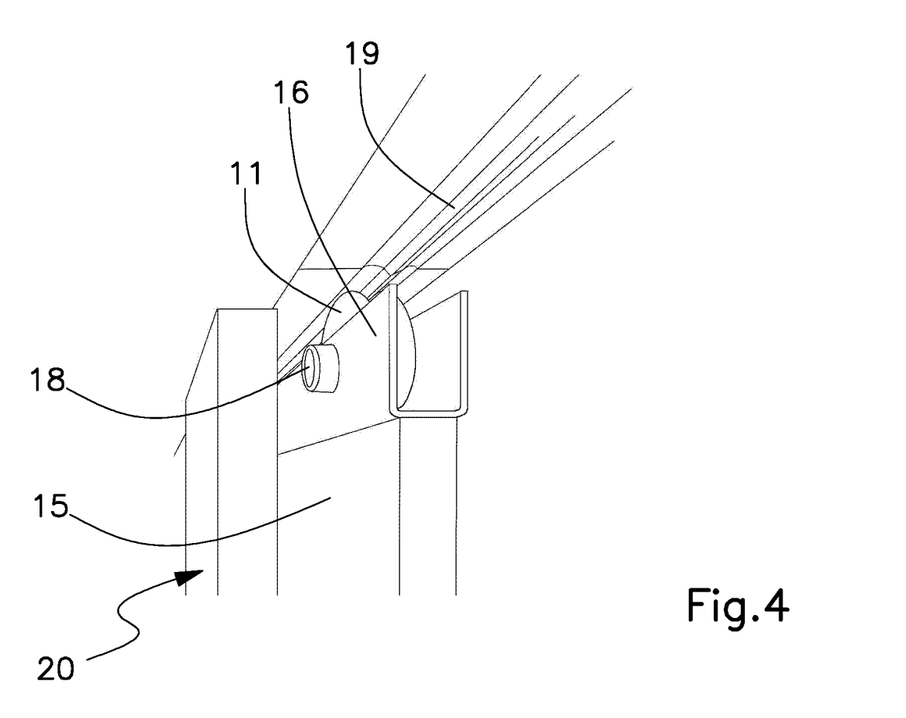
FIGS. 4 and 5 show a detail perspective view respectively of an upper portion and of a lower portion of the sliding door of the partition wall.
Figure 5:
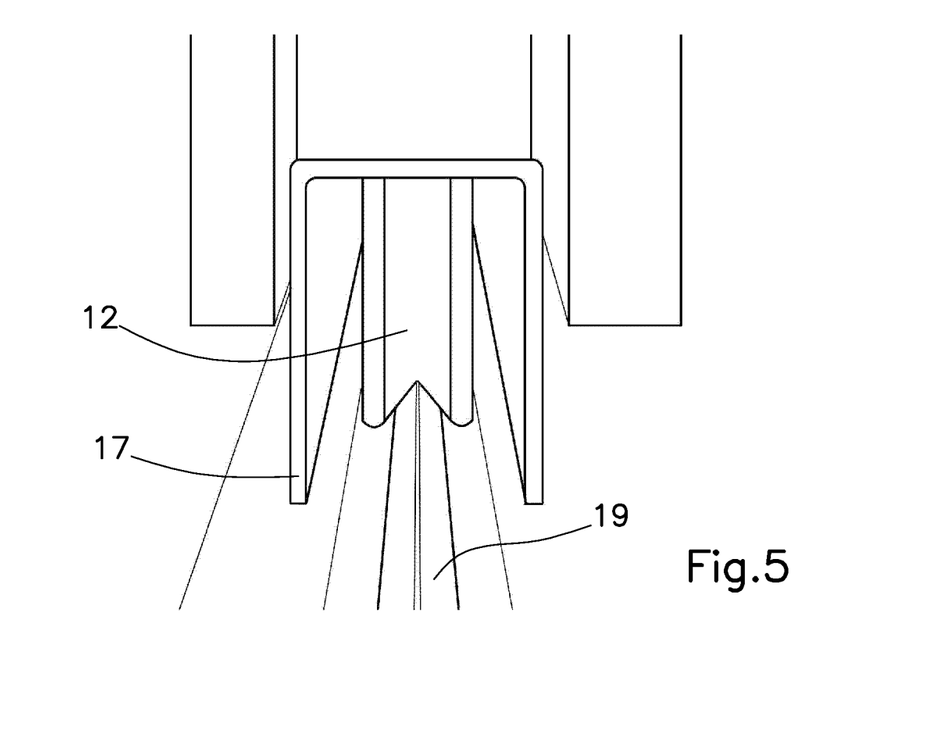
Figure 6:
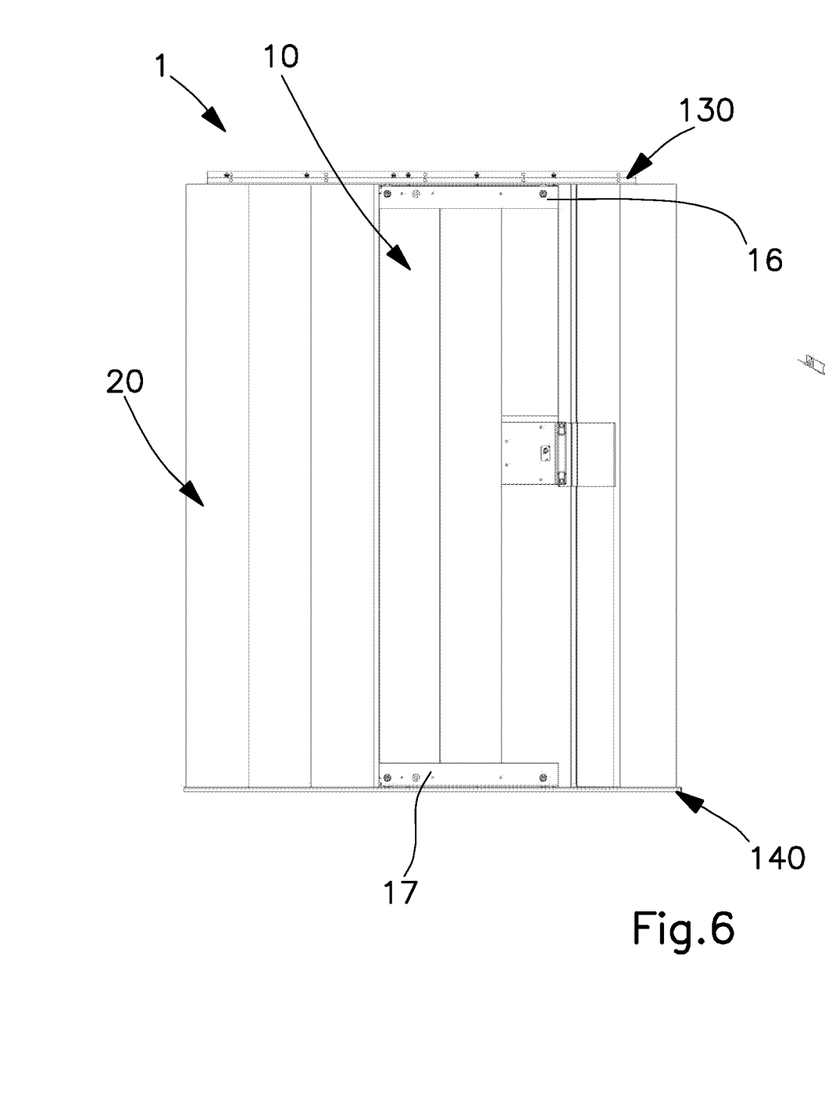
FIGS. 6 and 7 respectively show a front view and a side view of a different embodiment of the partition wall.
Figure 7:
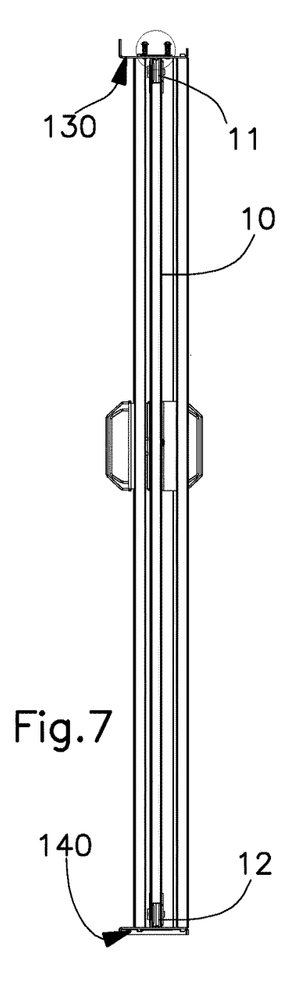
Figure 8:
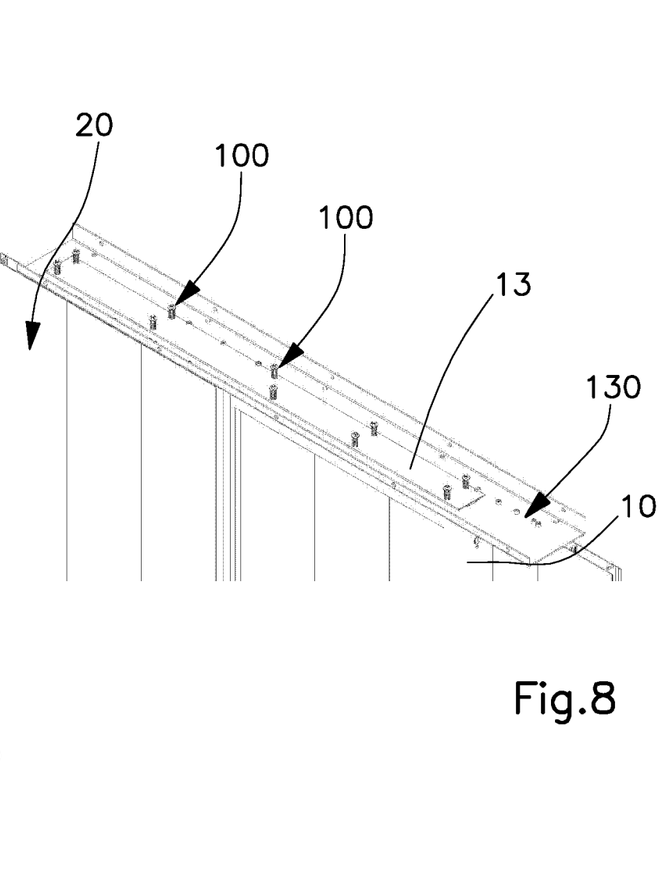
FIG. 8 shows a perspective view of an upper portion of the partition wall shown in FIG. 6.

More precisely, the sliding door 10 is made, in modular manner, by a plurality of longitudinal members 15 made up of aluminium extrusions; the aluminium extrusions preferably have knurled outer surface. The longitudinal members 15 are fixed, for example by self-tapping screws, to a joining profile 16, 17, upper and lower respectively. The joining profiles 16, 17 have a U-shaped cross-section so as to provide a sort of channel within which the sliding wheels 11, 12 are freely housed (see FIGS. 4 and 5). The sliding wheels 11, 12 are mounted freely rotatable on respective stems 18 which are fixed transversely to the joining profiles 16, 17.

The sliding wheels 11, 12 have a grooved profile predisposed to be coupled in use, in slidable manner, with a corresponding profile of a rail 19 shaped respectively by the upper guide 13 and the lower guide 14. Said profile preferably has a triangular shape. In practice, the rail 19 of the guides 13, 14 and the groove of the sliding wheels 11, 12 define in use a male-female sliding coupling.

The rail 19 is located at the opening 132, 142 of the respective support profile 130, 140 to enable the coupling with the sliding wheels 11, 12.

Figure 9:
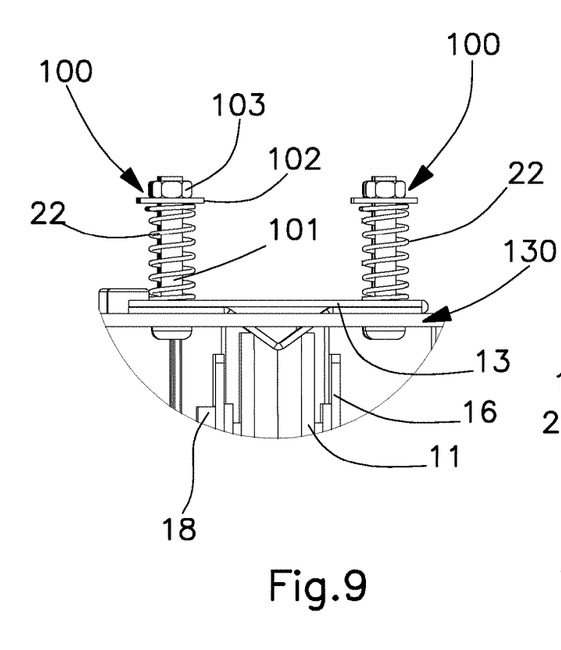
FIG. 9 shows a magnified detail of the partition wall shown in FIG. 7.

More precisely, the rail 19 is inserted through the opening 132, 142 of the respective support profile 130, 140 so as to protrude from the plane defined by the base surface 131, 141 of the support profile 130, 140 (see FIG. 9).

Figure 10:
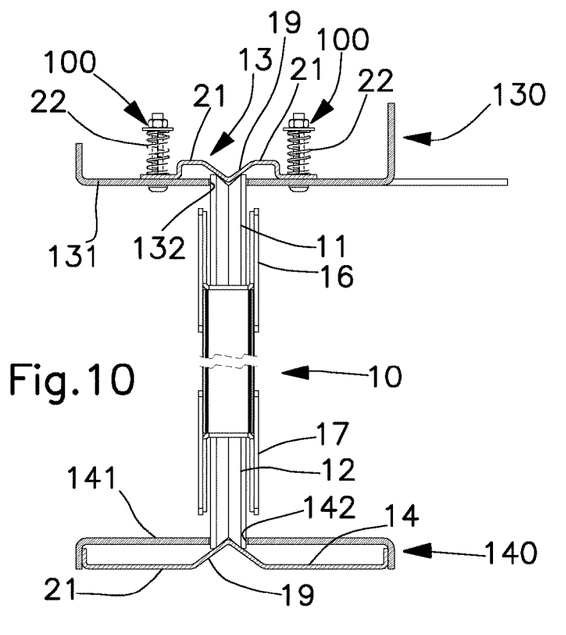
FIG. 10 shows a side view of the sliding door according to a different embodiment in which the upper portion and the lower portion magnified are shown.

Alternatively, each guide 13, 14 is advantageously spaced from the base surface 131, 141 of the support profile 130, 140 (see FIG. 10).

In particular, each guide 13, 14 has a portion 21 adjacent to the rail 19, from which the profile of the rail 19 extends, which is spaced from the base surface 131, 141 of the support profile 130, 140.

The rail 19 occupies a position above or below the opening 132, 142 depending on whether the upper or lower portion of the sliding door 10 is considered and the sliding wheels 11, 12 are partially inserted through said opening 132, 142 for making the coupling with the rail 19.

Thus, a portion of each wheel 11, 12 is enclosed on both sides by the support profile 130, 140 which prevents the wheel 11, 12 from being removed from the respective guide 13, 14 in the case of stress exerted on the sliding door 10.

Therefore, each wheel 11, 12 is able to slide along the respective guide 13, 14 and "embedded" in the channel defined by the opening 132, 142 of the respective support profile 130, 140.

At least one guide 13, 14 has elastic features to compensate for the backlash present in the coupling of the sliding wheels 11, 12 with the respective guides 13, 14. According to an embodiment, shows in FIGS. 6 to 10, elastic means 22 are associated with at least one guide 13, 14 to give the guide 13, 14 the same said elastic features. In practice, the elastic means 22 exert a compression force on the guide 13, 14 able to maintain the rail 19 in a position aligned with the sliding wheels 11, 12 and in contact with the grooved profile of the sliding wheels 11, 12.

The fact that guide 13, 14 is maintained in a compression state by said elastic means 22 permits to obtain an optimum coupling of each wheel 11, 12 with the rail 19.

It is possible to provide that such elastic means 22 are associated with the upper guide 13 or with the bottom guide 14. Alternatively, the elastic means 22 are mounted both on the upper guide 13 and on the lower guide 14.

The elastic means 22 comprise springs, preferably helical springs arranged around the screws 100, which keep the guides 13, 14 joined with the respective support profiles 130, 140 (see FIG. 9).

In particular, each helical spring 22 is wound around a stem 101 of the screw 100 and is at one end in abutment against a surface of the corresponding guide 13 so as to exert the said compression force.

At the opposite end, the helical spring 22 is preferably in abutment against a washer 102 coupled with a nut 103.

The springs 22 may be of different type, such as, for example, strip springs or rod springs.

As an alternative to the use of elastic means 22, the guides 13, 14 may be made of a material having elastic features.

In this case, if backlash is present in the coupling of each guide 13, 14 with the respective sliding wheels 11, 12, the guide, following the stress to which it is subjected, deforms and regains then, by virtue of its elastic features, its original shape. A compensation action for the backlash is thus obtained.

Preferably at least one guide 13, 14 is made of harmonic steel.

Alternatively, the sliding wheels 11, 12 have elastic features that allow to compensate for the backlash. In particular, said elastic means 22 may be associated with the sliding wheels 11, 12 for exerting a compression force on the coupling of the sliding wheels 11, 12 with the respective guides 13, 14.

Fixed plates 20 are similarly constituted in modular manner by a plurality of longitudinal members 23 made of aluminium extrusions.

The longitudinal members 23 are secured to the support profiles 130, 140, for example by self-tapping screws.

Making the sliding door 10 and of the fixed plates 20 through aluminium extrusions guarantees excellent mechanical strength with a low weight.

It is possible to perform a pre-mounting of the assembly comprising the fixed plates 20 and the sliding door 10.

Figure 11:
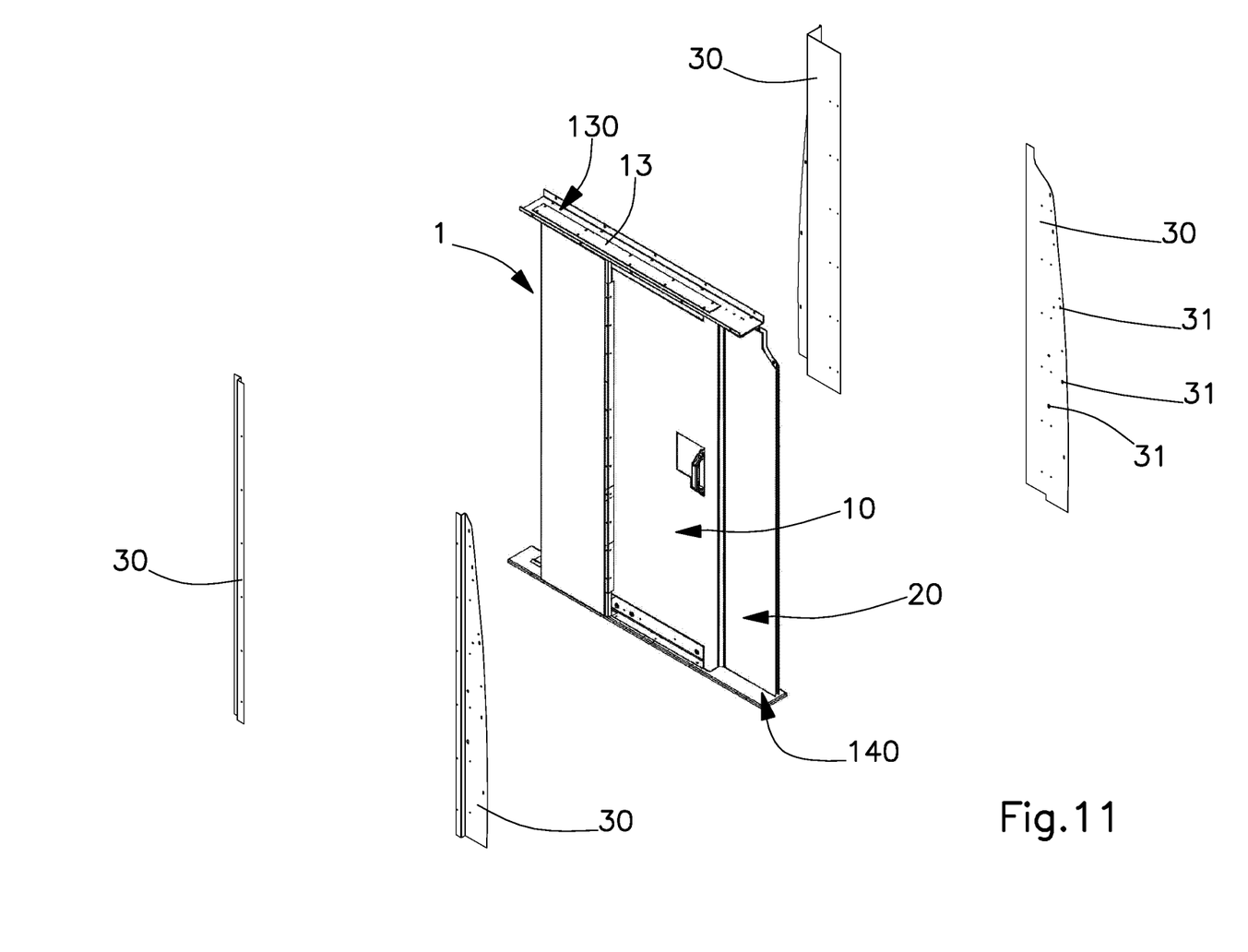
FIG. 11 shows the partition wall in assembly step.

This pre-mounting is eased by the possibility of connecting the guides 13, 14 with the respective support profiles 130, 140 which are fixed to the extrusions 23 of the fixed plates 20. Thus, the assembled sliding door 10 and fixed plates 20 can be fixed to the structure of the vehicle preferably through suitable moulded elements 30.

In particular, it is possible to prepare at least one first pair of moulded elements 30 on the vehicle, which constitute a base for mounting the partition wall. Next, it is possible to associate the partition wall with the first pair of moulded elements 30 through a second pair of moulded elements 30 predisposed to be connected with the respective first moulded elements 30. In practice, the second moulded elements 30 are mounted at the first moulded elements 30 and the partition wall is interposed between the two so as to be securely fastened to the vehicle.

The moulded elements 30 can be connected, for example, by screws passing through suitable locking holes 31 provided on the moulded elements 30.

This ensures reliable sliding of the door 10 without any alignment of the various components of the assembly comprising the door 10 and the fixed plates 20 on the vehicle.

The partition wall for commercial vehicles according to the invention therefore reaches the scope of easing the access from the cockpit to the loading compartment to the user.

Specifically, in the running condition of the vehicle, the sliding door 10 is locked in the closing position, for example by means of an anti-intrusion device operable from the cockpit. In such a condition, the partition wall is similar to a conventional closed wall of commercial vehicles without internal access to the loading compartment and thus it also guarantees the safety of the cockpit in the event of any movement of the load.

Advantageously, it is possible to paint the partition wall in a uniform colour, in particular the original vehicle's colour, so as to conceal the creation of the passage.

It is to be noted that in the driving conditions of the vehicle, the particular solution adopted for the assembly of the sliding door, i.e. through the grooved wheels of antinoise plastic material coupled with a rail having conjugated profile, guarantees an almost total reduction of vibrations and consequently the absence of annoying noises even on paths with imperfect background.

A prerogative of the invention is that at least one guide or, alternatively, the sliding wheels are provided with elastic features to compensate for the backlash that may arise in the coupling between the wheels and the respective rail guide. In this way, the noise of the sliding door due to the above-mentioned backlash is prevented with a consequent benefit for the carrier delivery driver.

When the vehicle is stopped, for example, for the delivery of an article, the driver can easily access the loading compartment through the sliding door. It should be noted that the rail on which the door slides below appropriately provides a very limited protrusion with respect to the bottom of the vehicle, in order to avoid stumbling to the user.

One aspect to point out is that the sliding wheels along each guide are protected on both sides by the respective support profile, thus eliminating the risk associated with a possible removal of the door from the guides due to stress. Consequently, the partition wall is stable and robust.

Another feature of the partition wall according to the invention is that it makes the assembly inside the vehicle very easy. In particular, the fact of being able to perform a pre-mounting of the assembly consisting of the fixed plates and the sliding door makes the assembly easy to mount on the vehicle. This greatly reduces the possibility of making assembly errors as assembly operations are quick and easy and above all do not require the mounting of numerous pieces to be aligned and coupled directly on the vehicle.

In practice, the used materials as well as the size and shape may vary according to the needs.

Should the technical characteristics mentioned in the claims be followed by reference signs, such reference signs were included for the sole purpose of increasing the understanding of the claims and thus they shall not be deemed limiting the scope of the element identified by such reference signs by way of example.

The invention claimed is:

1. A partition wall for commercial vehicles, the partition wall comprising:
   at least one fixed plate; and
   a sliding door slidable with respect to said fixed plate, said sliding door being predisposed to separate a cockpit of a vehicle from a loading compartment, said sliding door being provided, along an upper edge and along a bottom edge, with a plurality of sliding wheels slidable respectively on an upper guide and on a lower guide associated with a structure of said vehicle, said sliding wheels having a grooved profile predisposed to be coupled with a corresponding rail of said upper guide and said lower guide, said upper guide and said lower guide having a conjugate profile, at least one of said upper guide and said lower guide having elastic features so as to compensate for backlash existing in a coupling of said sliding wheels with a respective guide, wherein at least one of said lower guide and said upper guide is associated with an elastic means for compensating for said backlash existing in the coupling between said sliding wheels and said respective guide.

2. A partition wall according to claim 1, wherein said elastic means comprises a spring means.

3. A partition wall according to claim 2, wherein said spring means comprises helical springs, strip springs or rod springs.

4. A partition wall for commercial vehicles, the partition wall comprising:
   at least one fixed plate; and
   a sliding door slidable with respect to said fixed plate, said sliding door being predisposed to separate a cockpit of a vehicle from a loading compartment, said sliding door being provided, along an upper edge and along a bottom edge, with a plurality of sliding wheels slidable respectively on an upper guide and on a lower guide associated with a structure of said vehicle, said sliding wheels having a grooved profile predisposed to be coupled with a corresponding rail of said upper guide and said lower guide, said upper guide and said lower guide having a conjugate profile, at least one of said upper guide and said lower guide having elastic features so as to compensate for backlash existing in a coupling of said sliding wheels with a respective guide, wherein at least one of said lower guide and said upper guide is made of a material having elastic features so as to compensate for said backlash existing in said coupling between said sliding wheels and said respective guide.

5. A partition wall for commercial vehicles, the partition wall comprising:
   at least one fixed plate; and
   a sliding door slidable with respect to said fixed plate, said sliding door being predisposed to separate a cockpit of a vehicle from a loading compartment, said sliding door being provided, along an upper edge and along a bottom edge, with a plurality of sliding wheels slidable respectively on an upper guide and on a lower guide associated with a structure of said vehicle, said sliding wheels having a grooved profile predisposed to be coupled with a corresponding rail of said upper guide and said lower guide, said upper guide and said lower guide having a conjugate profile, at least one of said upper guide and said lower guide having elastic features so as to compensate for backlash existing in a coupling of said sliding wheels with a respective guide, wherein said grooved profile of said sliding wheels and said conjugate profile of said corresponding rail of said upper guide and said lower guide have a substantially triangular shape.

6. A partition wall according to claim 1, wherein said sliding wheels are made of plastic material.

7. A partition wall according to claim 1, wherein said sliding door comprises, in a modular manner, a plurality of longitudinal members made from aluminum extrusions.

8. A partition wall according to claim 7, wherein said plurality of longitudinal members re fixed to an upper joining profile and to a lower joining profile, the upper joining profile and the lower joining profile having a transverse U-shape profile to create respectively a sort of channel within which said sliding wheels are housed.

9. A partition wall according to claim 1, wherein said sliding door is lockable in a closed position by an anti-intrusion device.

10. A partition wall according to claim 1, wherein said upper guide and said lower guide are connected with respective support profiles predisposed to be mounted on said structure of said vehicle.

11. A partition wall according to claim 10, wherein each of said support profiles comprises a base surface predisposed for connection with said respective guide, said base surface having an opening extending in a longitudinal direction of said profile shaping a channel predisposed to allow insertion of at least a portion of said respective guide or of at least a portion of said sliding wheels.

12. A partition wall according to claim 11, wherein said rail of each of said upper guide and said lower guide is placed over or below said opening and said sliding wheels are inserted at least for a portion through said opening to allow coupling between said grooved profile of said sliding wheels and said conjugate profile of said corresponding rail, said sliding wheels being enclosed on both sides, at least for said portion, by said respective support profile so as to prevent removal of said sliding wheels from said respective guides.

13. A partition wall according to claim 11, wherein said rail of each of said upper guide and said lower guide is inserted through said opening of said support profile so as to protrude with respect to a plane defined by said base surface of said respective support profile.

* * * * *